W. H. SELLS.
CORN HUSKING MACHINE.
APPLICATION FILED OCT. 27, 1915.
1,281,081.
Patented Oct. 8, 1918.
2 SHEETS—SHEET 1.
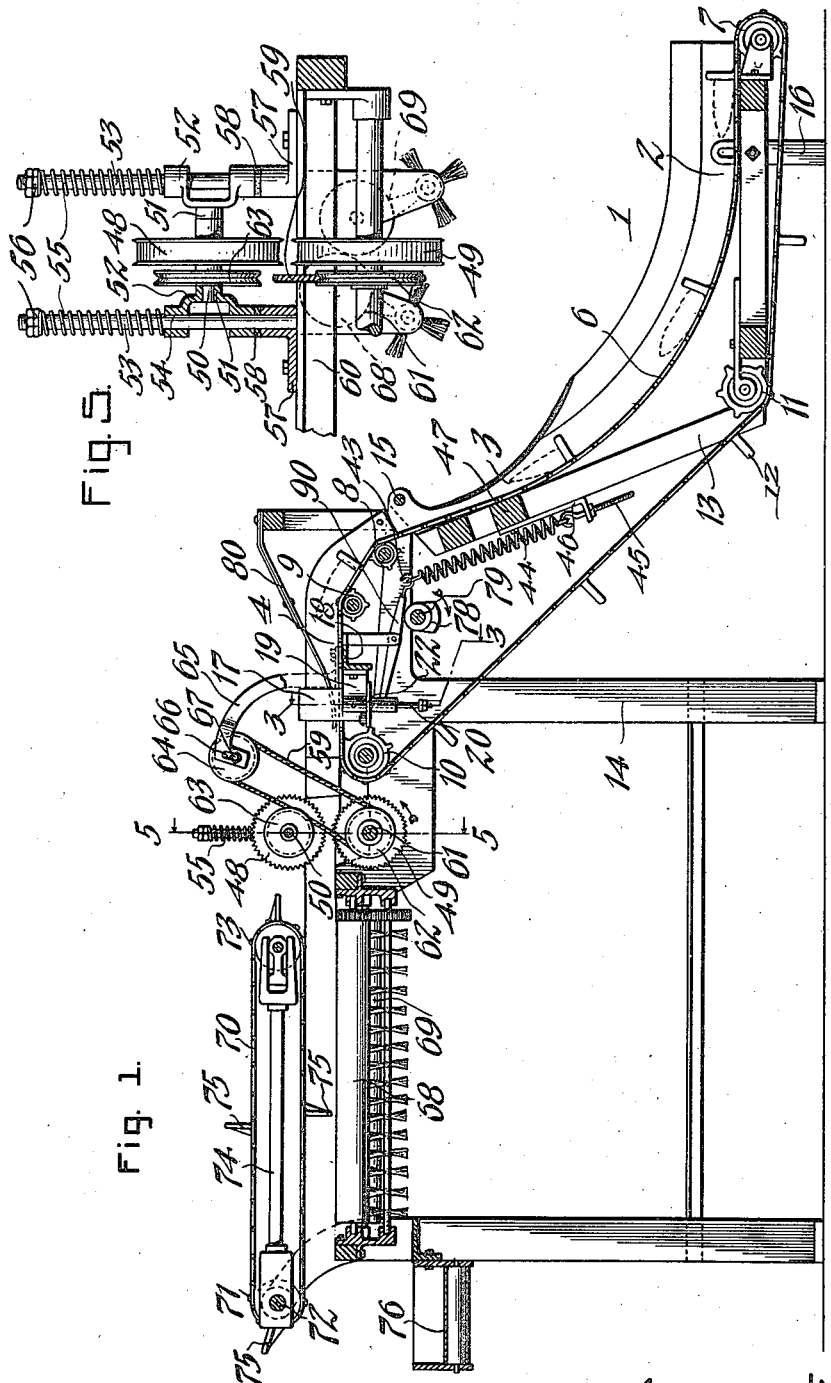
INVENTOR
William H. Sells
BY Geyer & Popp
ATTORNEYS.

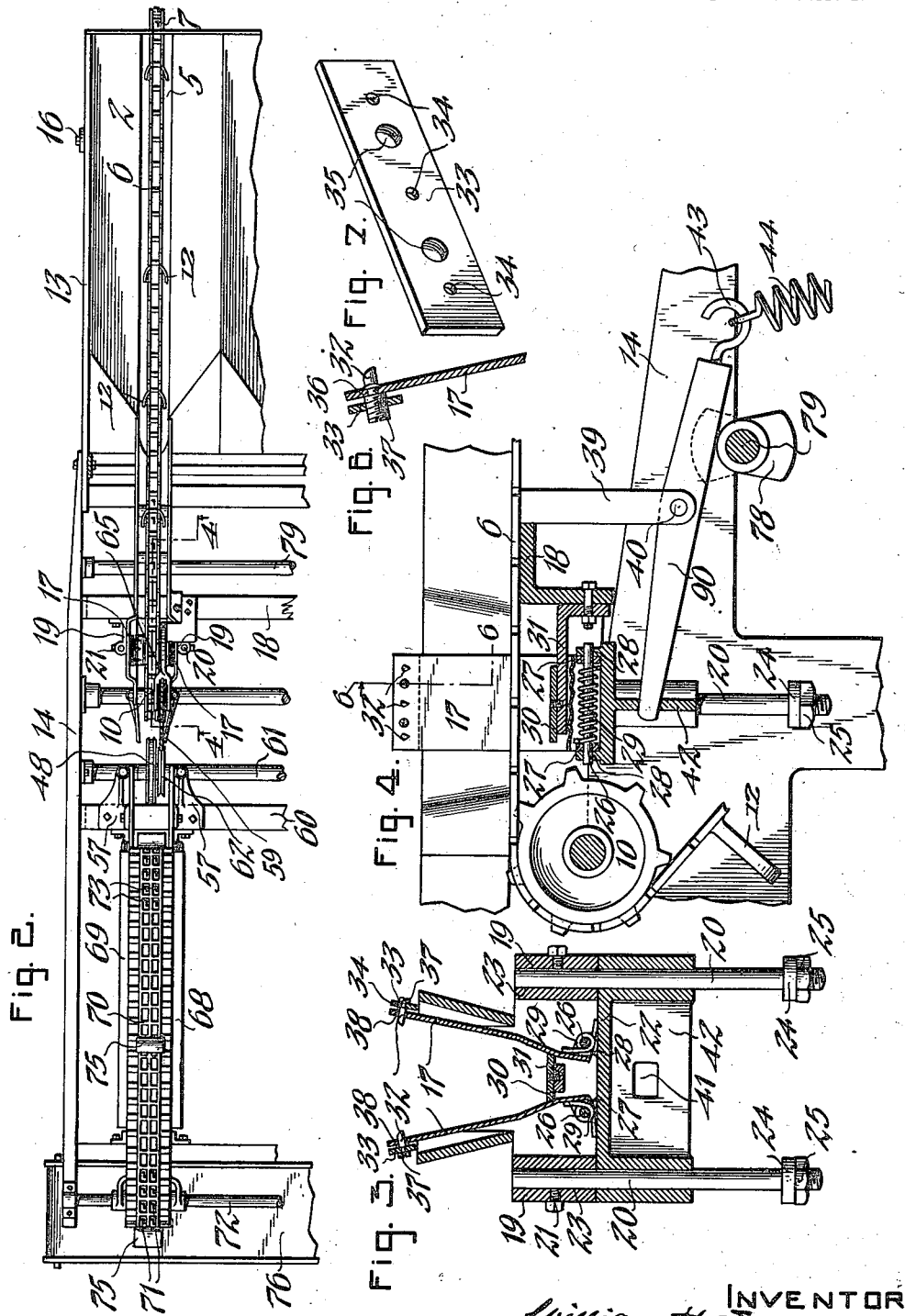

UNITED STATES PATENT OFFICE.

WILLIAM H. SELLS, OF BUFFALO, NEW YORK.

CORN-HUSKING MACHINE.

1,281,081.     Specification of Letters Patent.     Patented Oct. 8, 1918.

Application filed October 27, 1915. Serial No. 58,125.

*To all whom it may concern:*

Be it known that I, WILLIAM H. SELLS, a citizen of the United States, residing at Buffalo, in the county of Erie and State of New York, have invented new and useful Improvements in Corn-Husking Machines, of which the following is a specification.

This invention relates more particularly to a corn husking machine in which the unhusked ears of corn are fed, preferably though not necessarily automatically, one at a time by means of a feed belt to a stripping mechanism which engages the husks and loosens the latter from the corn before being delivered to the slitting and husking devices which fully remove the husks and silks from the ears of corn.

The object of this invention is to provide simple and efficient means whereby the husks of the green corn are seized by a stripping device provided with spurs or teeth which bite into the husks and sufficiently loosen or partly remove the same before being delivered to the slitting and husking mechanism, thereby assuring the clean removal of the husks.

A further object is to so construct the stripping device that the spurs or teeth, which engage or bite into the husks of the ears of corn, can be adjusted to adapt themselves to ears of different sizes, as well as husks of different thicknesses.

In the accompanying drawings:

Figure 1 is a vertical longitudinal section of the machine, taken lengthwise through one of the feeding, stripping, slitting and husking mechanisms. Fig. 2 is a fragmentary top plan view of the same, showing one complete run. Fig. 3 is an enlarged vertical transverse section thereof taken on line 3—3, Fig. 1, and showing the stripping device. Fig. 4 is an enlarged fragmentary vertical longitudinal section on line 4—4, Fig. 2. Fig. 5 is an enlarged fragmentary vertical transverse section taken on line 5—5, Fig. 1. Fig. 6 is a fragmentary vertical section, on an enlarged scale, taken on line 6—6, Fig. 4, of the tooth adjusting means on the jaws. Fig. 7 is a perspective view of the adjusting plate carried by the stripping device.

Similar characters of reference indicate corresponding parts throughout the several views.

1 represents the feeding trough which is of any well known construction, and as shown in the drawings, consists of a lower receiving portion 2, an inclined intermediate portion 3 and an upper horizontal delivery portion 4, all of said portions being in alinement with each other. Passing through a longitudinal slot 5 in the feeding trough is a feed belt 6, the receiving end of which engages a sprocket wheel 7, and thence passes upwardly along the inclined portion of said trough over two intermediate sprocket wheels 8, 9, thence forwardly and over a delivery sprocket 10, thence downwardly and rearwardly around a lower idle intermediate sprocket wheel 11 to the first mentioned sprocket wheel. This feed belt is provided at intervals of its length with upwardly projecting feeding-wings 12 which are adapted to engage with the butt-end of the ears of corn in the usual manner.

As shown in the drawings, the receiving portion 2 of the feeding trough, together with the sprocket-wheels 7, 11, is mounted on the front section 13 of the main frame, while the delivery portion of the feeding trough, together with the intermediate sprocket-wheels 8, 9, delivery sprocket 10, and stripping or shredding, slitting and husking mechanisms, hereinafter described, is mounted on the rear section 14 of the main frame. The two frame sections are joined or pivoted together on opposite sides, as shown at 15, the front frame section 13 being adjustable and supported at opposite sides thereof by adjustable feet 16.

Arranged in front of the delivery end of the feed trough is a preliminary stripping or shredding device, which is adapted to automatically grip, strip and release the ears of corn so as to loosen the husks therefrom preparatory to being operated on by the husk slitting and removing mechanism. This device is preferably constructed as follows:

Mounted on the transverse bars 18 of the main frame are a pair of brackets or supports 19 to which are secured downwardly projecting guide rods or posts 20 by means of set screws 21. A carriage or cross-head 22 is guided on these rods by means of guide openings 23 which receive said rods. In its operation, this carriage rises and falls, the upward movement thereof being limited by the top of the carriage engaging the underside of the supports 19, while the downward movement thereof is limited by the underside of the carriage engaging with stop washers 24 located at the lower end of the guide rods and held thereon by means of nuts 25. A pair of opposing jaws 17 are hinged horizontally and lengthwise at their base or lower ends to the carriage 22 by means of pintles or pins 26 passing through openings in the lugs or hinge members 27, 28, of the jaws and carriage respectively. To yieldingly bring the jaws together in order to grip an ear of corn, each pintle is surrounded by a spiral spring 29, one end of which bears against the adjacent portion of the jaw and the other end against the adjacent portion of the carriage, this arrangement always tending to close the jaws. These jaws are held open or inoperative by means of a fixed spreading plate 30 mounted intermediate the two jaws on a suitable support 31, which, as shown, in the drawings Fig. 4, is secured to the transverse bar 18. The side edges of this spreading plate, which engage the inner surface of the jaws, are beveled to conform to the inclination of the latter. It will be evident from the foregoing, that in the vertical movement of the carriage the inner sides of the jaws 17 continually engage the side edges of the plate 30, the contact between the two parts being effected by means of the spring 29. As the carriage and jaws are elevated the latter are spread by the plate 30 and during the descent of the carriage and jaws the latter are released by this plate and pressed toward each other by the springs 29.

The upper portions of the opposing surfaces of the jaws 17 are provided with a plurality of spurs or teeth 32 which bite into the husks and strip the same, thus performing the first of three operations in removing the husks from the corn. These teeth or spurs are preferably adjustable so as to adapt themselves to ears of different sizes as well as husks of various thicknesses. As shown in the drawings, the teeth forming a set for each of these jaws are securely fastened to an adjusting plate 33 which is provided along its longitudinal center with a series of openings 34 for receiving the ends of the spurs, the latter being preferably riveted to said plate. Passing through screw threaded openings 35 in the adjusting plate and rivet openings 36 in the stripping jaws are adjusting screws 37, which are journaled on the upper portion of one of said jaws but held against lengthwise movement therein to permit the adjustment of the plate 33 carrying the spurs, this being preferably accomplished by loosely riveting the screws 37 in the plate 33, as shown in Fig. 6. These teeth or spurs pass through openings 38 in the companion jaw 17 which register therewith and are somewhat larger in diameter to allow the free passage of the spurs therethrough. When it is desired to adjust the plate 33, the adjusting screws are turned, thereby moving the plate toward or from the jaws and causing the spurs or teeth to project more or less from the inner sides of the jaws as may be desirable or necessary to insure the best results while biting into an ear of corn.

The raising and lowering of the carriage on which the gripping jaws are hinged is effected by means which preferably comprise a rocking arm or lever 90 pivoted to the support 39 by a pin 40 so as to swing vertically. The rear end of this lever engages an opening 41 in the web 42 of the carriage 22, while the front end is provided with a hook 43 to which is attached one end of a coiled spring 44. The lower end of this spring engages an adjustable hook bolt 45 secured to a bracket 46 fastened to the cross piece 47 or other suitable part of the frame. This spring yieldingly retains the carriage 22 in its raised position. The rocking arm or lever is rocked by means of the cam 78 mounted on the transverse shaft 79 and which is so timed that the lowest point of said cam engages the rock arm when the carriage is in its raised position and the highest point of said cam engages the lever or rock arm when the platform is in its lowermost position or while the stripping jaws are closed and biting into an ear of corn.

As the ears of corn approach the mouth of the stripping jaws, the carriage on which the jaws are mounted, is in its raised or uppermost position and when the ear of corn reaches the throat or the point where it is confined between the two opposing jaws, said carriage is simultaneously lowered which in turn causes the jaws to close while the teeth thereof bite into the husks of the corn and loosen or strip the same from the ear as the carriage continues its downward movement. As the ear of corn is grasped by the teeth of the jaws the ear continues its forward movement under the action of the respective propeller wing but the jaws pass downwardly below the path of this wing before the latter reaches the jaws, but after the wing passes the jaws the latter again ascend preparatory to engaging the next ear. During this operation the jaws strip the husks of the ears while the latter are in motion and without interfering with the ear propelling devices which subsequently presents the ear to the slitting devices. It will be understood that the best results are obtained when the central part of the corn is engaged by the teeth of the jaws.

A spring finger or arm 80 is adapted to bear against the upper portion of the ear of corn as it approaches the stripping jaws, and thus not only prevents the corn from accidentally being miscarried but also serves to hold the corn firmly against the delivery belt while being engaged by the spurs or teeth of the stripping jaws.

48, 49 represent upper and lower rotary cutters between which the ears are delivered by the feed belt and whereby the ears of corn are slitted lengthwise. These cutters are arranged in rear of the delivery end of the feed belt and are both rotated so that their opposing sides turn in the same direction in which the corn is delivered from the feed belt, thereby not only serving to slit the husks of the corn but propel the same to the husking mechanism. The lower rotary cutter 49 of the slitting mechanism is mounted on a transverse driving shaft 61 which is journaled in stationary bearings on the main frame. The upper cutter is capable of moving vertically toward and from its coöperating lower cutter, so as to adapt these cutters to different sizes of ears of corn. The upper rotary cutter 48 is keyed to the transverse shaft 50 which is journaled in bearings 51 formed on the slides 52. These slides run vertically on upright posts 53 passing through openings 54 in said slides, the latter being yieldingly held in a depressed position by means of springs 55 which surround said posts and engage their lower ends with the top of the slides while their upper ends engage with stop nuts 56 at the upper end of the posts. The latter are rigidly secured at their lower ends to the bases 57 mounted on the transverse bar 60. Cushions or washers 58 of rubber or other flexible material are interposed between the slides and bases to prevent undue jarring of the related parts when they come together. The downward movement of the upper cutter is limited, so as to prevent the same from coming in contact with the lower cutter, by engagement with the slides 52 with the bases 57.

Motion is transmitted to the upper cutter from the driving shaft 61 by means of a flexible cord or rope belt 59 passing around the pulley wheel 62 secured to said driving shaft, then passing upwardly and frictionally engaging the forward face of the pulley wheel 63 secured to the transverse shaft 50 of the upper cutter, and hence upwardly and around the adjustable pulley wheel 64, which is mounted on a supporting arm 65 secured to the transverse bar 18 of the main frame. The upper end of this arm is bifurcated and is provided with slots 66 which receive the axle of the pulley wheel 64 and in which the latter can be adjusted when desired and held in place by screw nuts 67.

The lineal speed of the corn propelling belt 6 is somewhat slower speed than the peripheral speed of the rotary cutters 48, 49, whereby the ear of corn, upon being delivered from the feed belt to these cutters, is quickly and effectively thrown or shot to the husking mechanism which will presently be described.

The husking mechanism to which the ears of corn are delivered by the cutters and whereby the husks are wholly removed from the ears, comprises two husking rollers 68, 69, which are arranged lengthwise in rear of said cutters. These rollers are arranged parallel with one somewhat higher than the other and are rotated, so that their contiguous portions move downwardly, thereby stripping the husks and silks from the ears and discharging them below the rollers. The husking rollers may be operated by any well known or appropriate means.

The husked ears of corn are moved rearwardly over the rollers by means of a clearing belt 70 provided for this purpose. This belt passes around a pair of rear sprocket wheels 71 journaled on a transverse driving shaft 72 and around a pair of front sprocket wheels 73 which are mounted on the front end of the frame 74 hung with its rear end on said driving shaft. 75 represents feeding wings which are secured at intervals to the outer side of the clearing belt and which propel the corn rearwardly over the husking rollers. Upon reaching the rear ends of the rollers, the husked ears of corn are discharged rearwardly on to an endless belt 76, and thence carried to a receptacle provided for receiving the corn as it reaches the end of the belt.

I claim as my invention:

1. In a corn husking machine, the combination of a feed belt, a pair of stripping jaws, a vertically movable carriage on which said jaws are mounted, and means for raising and lowering said carriage consisting of a rocking lever engaging said carriage, a spring connected with said lever and operating to turn the same in one direction and a cam engaging said lever and operating to turn the same in the opposite direction.

2. In a corn husking machine, the combination of a pair of stripping jaws, a vertically movable carriage, means for yieldingly mounting said jaws on said carriage comprising a hinge connecting each jaw with said carriage and a spring surrounding the pintle of each hinge and engaging one end on the adjacent portion of the respective jaw and the other end with the adjacent portion of the carriage, said springs constantly tending to bring said jaws together for grasping an ear of corn, and a fixed spreader plate interposed between said jaws for opening the same.

3. In a corn husking machine, the combination of a pair of stripping jaws, each of which is provided with tooth openings, an adjusting plate arranged on the outer side of each jaw and provided with a plurality of teeth arranged in the openings of one jaw and projecting inwardly therefrom, and adjusting screws engaging screw threaded openings in said plate and journaled on said jaws.

4. A corn husking machine comprising a feed belt provided with a wing for engaging an ear of corn, positively operated means movable perpendicularly relatively to the path of the belt for stripping the husks of said ear while the same is being propelled by said belt and wing and which move perpendicular to the path of the corn and means other than the material acted on for positively operating the stripping means.

5. A corn husking machine comprising a feed belt provided with a wing for engaging an ear of corn, positively operated means movable perpendicularly relatively to the path of the belt for stripping the husks of said ear while the same is being propelled by said belt and wing and which move perpendicularly to the path of the corn in one direction in front of said wing and in the opposite direction in rear of said wing and means other than the material acted on for positively operating the stripping means.

6. In a corn husking machine, a feeding device positively operated for feeding ears of corn longitudinally, positively operated means movable perpendicularly relatively to the path of the feeding device for loosening the husks of said ears and means other than the material acted on for positively operating the stripping means.

7. In a corn husking machine, an initial feeding device for feeding corn longitudinally, a loosening device acting perpendicular to the feeding device for loosening the husks from the corn, final separating means which remove the husks from the corn, means for moving the corn from said loosening device to said final separating means, and means for operating said moving means at a greater speed than the movement of said initial feeding device.

8. In a corn husking machine, the combination of husking rolls, a feed belt having wings, a pair of stripping jaws adapted to engage the husks of an ear of corn, upper and lower rotary feeders arranged in rear of said feed belt and stripping jaws and means for moving the corn from said rotary feeder toward said husking rolls at a speed greater than the speed of the initial feeding device toward said rotary feeders.

WILLIAM H. SELLS.